UNITED STATES PATENT OFFICE.

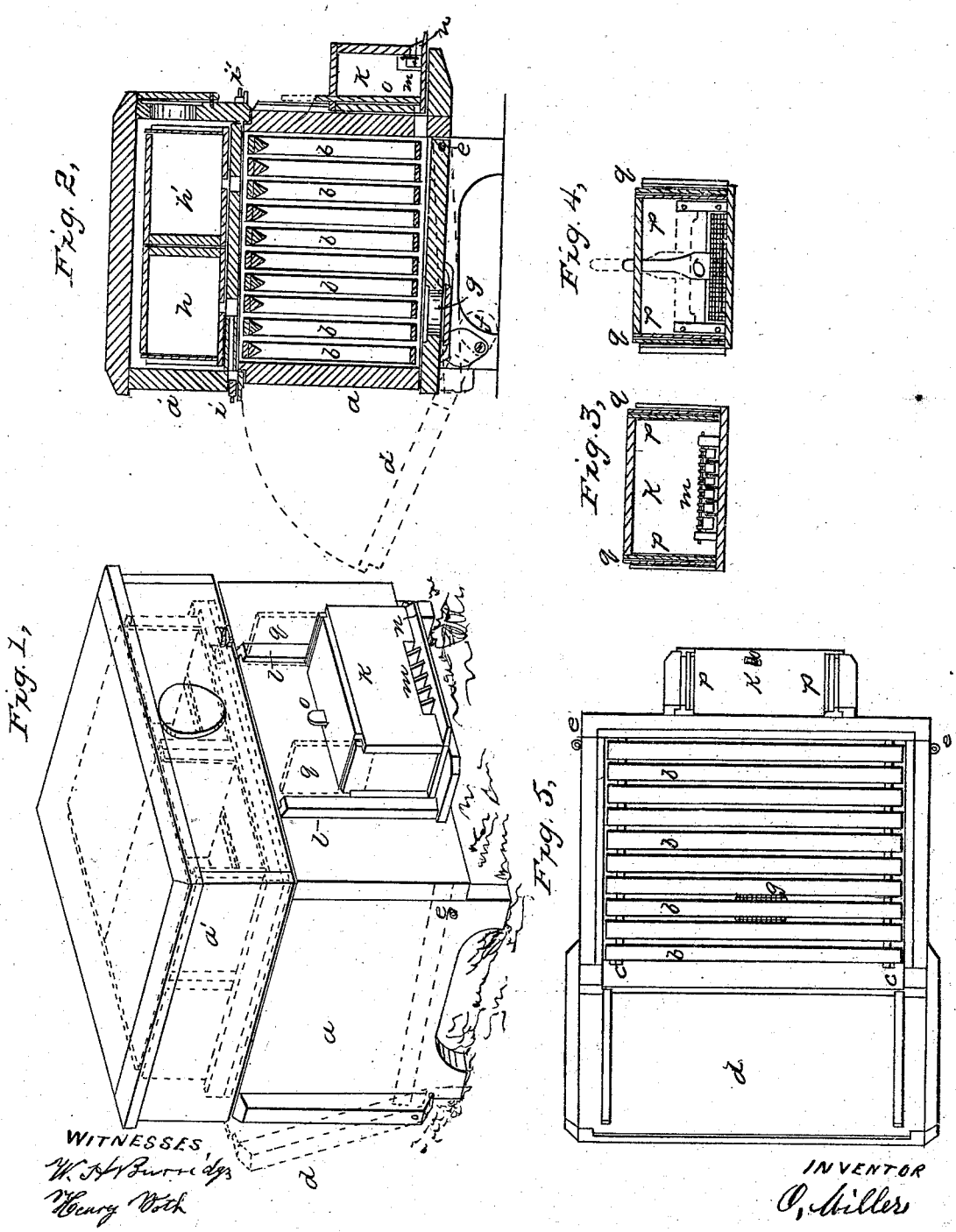
O. MILLER.
Bee Hive.
No. 31,900.
Patented April 2, 1861.

ORLANDO MILLER, OF GIRARD, PENNSYLVANIA.

BEEHIVE.

Specification of Letters Patent No. 31,900, dated April 2, 1861.

*To all whom it may concern:*

Be it known that I, ORLANDO MILLER, of Girard, in the county of Erie and State of Pennsylvania, have invented new and useful Improvements in Beehives; and I do hereby declare that the following is a full and complete description of the construction and operation of the same, reference being had to the accompanying drawings, making part of this specification, in which—

Figure 1, is a perspective view. Fig. 2 is a vertical transverse section. Figs. 3 and 4 are longitudinal sections of the drone and robber trap, and Fig. 5, is a top view with the upper section of the hive removed.

Like letters refer to like parts.

My invention relates to the construction, arrangement and operation of the drone and robber trap. A general description of the body of the hive, will therefore only be given.

The body of the hive is shown at ($a$ $a'$). The lower section ($a$,) consists of a box of proper form and size, in which the comb frames ($b$,) are hung. The ends of these frames rest upon the edge of a strip of hoop iron, as seen at ($c$) which is set into the top of the inner boards of the case ($a$). The back side of the box ($a$), is hung at its lower corners upon a pin joint, so that it can be turned down as seen at ($d$) in Figs. 1, 2 and 5, by which means, I can gain free access to the frames ($b$). The bottom board of the hive is also hung upon pin joints, as seen at ($e$) Fig. 2, the opposite end being supported by eccentric buttons, ($f$) in order that it may be dropped a little and graduated for the ingress and egress of the working bees, and for cleaning and ventilation. There is also a permanent ventilation in the bottom board as seen at ($g$) which is covered with wire cloth.

The top section of the hive ($a'$) is simply a receptacle for the honey boxes. This can be removed at pleasure, when the boxes ($h$, $h'$,) will be exposed to view, for removal or replacement at pleasure. Upon each side of this upper section, I provide bee entrances, which are shown at ($i$, $i'$) in Fig. 2. There is also a ventilator ($j$) in the side of section ($a'$).

The drone or robber trap, consists of a detachable box ($k$) which is held by guides ($l$) at the front of the hive, so as to cover the opening for the egress and ingress of the bees. This trap consists of a rectangular box inclosed on all sides. In front, there is a series of doors ($m$) made of very light material, and hinged at the top as seen in Figs. 2 and 3, and so secured by a stop, that they can only swing inward. The space between the bottom of the door, and the alighting board ($n$) is just sufficient to let the working bee pass, without swinging back the door, but the drones being larger than the workers, can pass into the trap, by swinging up the door, but they cannot return by the same passage, because the door partly closes up the space, making it too small for their bodies; while the working bee, being smaller, can pass out and in at pleasure. The drones being once out of the hive, will seek the most convenient entrance, and will naturally alight upon the alighting board ($n$) and enter through the hinged doors ($m$), but they cannot return, and they are prevented from entering the hive by means of the wire screen gate ($o$) Fig. 4, which is raised only enough to allow the working bees to pass.

Upon each side of the trap, is a pane of glass ($p$) which is covered by a slide ($q$). These slides are usually raised to allow light to pass into the trap, and thus induce the drones to enter, where they fruitlessly seek an exit through the glass. Or the trap may be adjusted to the entrance of the hive, as seen in Fig. 5, it being the reverse of that seen in Fig. 1, in which case the drones will enter the trap through the doors ($m$) directly from the hive; and when their services are no longer needed for the impregnation of the ovum, they can be removed and destroyed at pleasure by the apiarian.

In capturing robbers, the trap has to be set as in Fig. 1. The robbers enter the hive through the doors ($m$) the slides ($q$) being up, they will in vain seek an exit through the glass, all the apertures except ($m$) and ($o$) being closed. By keeping the gate ($o$) open, the robbers can be admitted into the hive and colonized. In this way, I have made a good healthy swarm from a poor one.

This trap can be attached to, or removed from the hive at pleasure. It may be so placed, as to receive the drones from within or from without as described.

What I claim as my improvement and desire to secure by Letters Patent, is—

The detachable drone and robber trap, constructed and arranged in the manner and for the purpose substantially as specified.

O. MILLER.

Witnesses:
W. H. BUNIDGE,
HENRY VOTH.